US012597861B2

(12) United States Patent
Zou et al.

(10) Patent No.: US 12,597,861 B2
(45) Date of Patent: Apr. 7, 2026

(54) SYSTEM AND METHOD FOR COMMUNICATING DRIVER READINESS TO A CONTROLLER

(71) Applicant: SEMICONDUCTOR COMPONENTS INDUSTRIES, LLC, Scottsdale, AZ (US)

(72) Inventors: Han Zou, Gibert, AZ (US); David H. Elwart, II, Sachse, TX (US); Paul J. Harriman, Indian Harbour, FL (US); Michael Scott Lay, Tempe, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 221 days.

(21) Appl. No.: 18/435,788

(22) Filed: Feb. 7, 2024

(65) Prior Publication Data

US 2024/0413738 A1 Dec. 12, 2024

Related U.S. Application Data

(60) Provisional application No. 63/506,604, filed on Jun. 7, 2023.

(51) Int. Cl.
    *H02M 3/158*    (2006.01)
    *H02M 1/00*    (2007.01)
    (Continued)

(52) U.S. Cl.
    CPC ....... *H02M 3/1584* (2013.01); *H02M 1/0006* (2021.05); *H02M 1/32* (2013.01);
    (Continued)

(58) Field of Classification Search
    CPC .... H02M 1/0006; H02M 1/0032; H02M 1/32; H02M 1/327; H02M 1/36; H02M 3/1584; H02M 3/1586
    See application file for complete search history.

(56) References Cited

U.S. PATENT DOCUMENTS

2022/0057855 A1* 2/2022 Zou ........................... G06F 1/32
2022/0100253 A1* 3/2022 Zhou ....................... H02M 1/36
(Continued)

OTHER PUBLICATIONS

MPS, MP86998 Data Sheet, "Intelli-PhaseTM Solution with Integrated HS-/LS-FETs and Driver in TLGA (5mmx6mm) Package," Rev 1.0, 15 pages, Nov. 3, 2020.
(Continued)

*Primary Examiner* — Fred E Finch, III
(74) *Attorney, Agent, or Firm* — Brake Hughes Bellermann LLP

(57) ABSTRACT

A switching regulator is disclosed that includes a driver having a driver-wake circuit configured to report its readiness for operation during a startup period. The driver-wake circuit can operate during startup by temporarily drawing power from the controller's power supply until the driver's power supply has reached a level sufficient to power the driver-wake circuit. The driver-wake circuit is configured to communicate the status of the driver's power supply during startup over a pin typically used to communicate temperature. Thus, the disclosed driver can communicate status during startup without needing extra pins, and because the circuitry is automatically disconnected after startup, very little additional power is consumed.

22 Claims, 9 Drawing Sheets

(51) Int. Cl.
_H02M 1/32_ (2007.01)
_H02M 1/36_ (2007.01)

(52) U.S. Cl.
CPC .............. _H02M 1/36_ (2013.01); _H02M 1/008_ (2021.05); _H02M 1/327_ (2021.05)

(56) References Cited

U.S. PATENT DOCUMENTS

| | | | |
|---|---|---|---|
| 2023/0009382 A1* | 1/2023 | Song | H03K 17/163 |
| 2023/0048949 A1* | 2/2023 | Nguyen | H02M 1/0043 |
| 2023/0170796 A1* | 6/2023 | Venkateswaran | H02M 1/36 |
| | | | 323/282 |
| 2024/0113609 A1* | 4/2024 | Domingo | H02M 3/1584 |
| 2024/0313634 A1* | 9/2024 | Routledge | H02M 1/0032 |

OTHER PUBLICATIONS

Semiconductor Components Industries, LLC, NCP303152 Data Sheet, "Integrated Driver and MOSFET with Integrated Current Monitor," 25 pages, Dec. 2020.
Semiconductor Components Industries, LLC, NCP303160 Data Sheet, "Integrated Driver and MOSFET with Integrated Current Monitor," Rev. 2, 24 pages, Dec. 2021.

\* cited by examiner

700

710 — CONNECT READY-DETECTION CIRCUIT TO TMON

720 — RECEIVE OPEN-CIRCUIT OR SHORT-CIRCUIT READY-DETECTION CIRCUIT

730 — TMON = OPEN CKT?

T

740 — PULL-UP TMON TO A VOLTAGE GREATER THAN A READY THRESHOLD

F (TMON SHORT TO GND)

750 — COMPARE TMON VOLTAGE (V$_{TMON}$) TO READY THRESHOLD

760 — V$_{TMON}$ ≥ READY THRESH?

780 — DRIVER READY

770 — DRIVER NOT READY

790 — CONNECT TEMPERATURE MONITORING CIRCUIT TO TMON

SYSTEM AND METHOD FOR COMMUNICATING DRIVER READINESS TO A CONTROLLER

CROSS-REFERENCE TO RELATED APPLICATION

This application claims the benefit of U.S. Provisional Application, No. 63/506,604, filed on Jun. 7, 2023, which is hereby incorporated by reference in its entirety.

FIELD OF THE DISCLOSURE

The present disclosure relates to power electronics and more specifically to a switching regulator configured to provide a regulated voltage to a rail (or rails).

BACKGROUND

A switching regulator may be desirable for its ability to efficiently provide a regulated voltage at high currents for applications that require high-power (e.g., $V_{CORE}$ supply for computing). A switching regulator may include high-power switches configured to alternatively charge and discharge an inductor. The high-power switches can be switched at a duty cycle that can be increased or decreased to control a direct-current (DC) voltage at an output of the switching regulator. Accordingly, a switching regulator includes a controller configured to control the duty cycle of the switching signals to provide a constant output voltage as load conditions change. The controller is a low-power device, while the switches are high-power devices. Accordingly, the voltage regulator includes a driver configured to drive the high-power switches based on low-power switching signals from the controller. In some implementations, the driver and the switches are integrated together in a device.

SUMMARY

A driver and a controller may operate based on power from different power supplies, which may startup differently. A startup period before switching begins allows both power supplies to stabilize. This startup period may be longer than desired because the driver cannot communicate the status of its power supply until a communication channel is established between the controller and the driver. A need exists for a driver to communicate its status more quickly in a way that does not require additional pins and/or excessive power.

Accordingly, in some aspects, the techniques described herein relate to a switching regulator including: a driver coupled to a driver power supply; a controller coupled to a controller power supply and configured to couple the controller power supply to the driver during a startup period; and a driver-wake circuit, included in the driver, receiving power from the controller power supply during the startup period to control a temperature-monitoring pin of the driver according to a driver-supply voltage of the driver power supply.

In some aspects, the techniques described herein relate to a method for sensing a readiness of a driver in a switching regulator, the method including: starting a controller power supply for a controller of the switching regulator; enabling a driver power supply of the driver of the switching regulator; coupling the controller power supply to a driver-wake circuit of the driver; coupling the controller power supply to a gate of an output transistor while a driver-supply voltage of the driver power supply is less than a controller-supply voltage of the controller power supply; configuring the output transistor in an ON condition using power from the controller power supply to pull-down a temperature-monitoring pin of the driver to a low-voltage level while the driver-supply voltage is less than the controller-supply voltage; decoupling the controller power supply from the gate of the output transistor while the driver-supply voltage is greater than or equal to than the controller-supply voltage; configuring the output transistor in an OFF condition using power from the driver power supply to open-circuit the temperature-monitoring pin while the driver-supply voltage is greater than or equal to the controller-supply voltage; and sensing the readiness of the driver based a condition of the temperature-monitoring pin.

In some aspects, the techniques described herein relate to a multiphase switching regulator including: a controller configured to receive power from a first power supply at a first-supply pin and to couple the power from the first power supply to a driver-ON pin; a first driver coupled to the driver-ON pin at a first-driver-wake pin and coupled to a second power supply at a second-supply pin, the first driver including configured to: receive power from the first power supply and block power from the second power supply while a second power supply voltage is less than a first power supply voltage; and a second driver coupled to the driver-ON pin at a second-driver-wake pin and coupled to a third power supply at a third-supply pin, the second driver including configured to: receive power from the first power supply and block power from the third power supply while a third power supply voltage is less than the first power supply voltage.

In some aspects, the techniques described herein relate to a switching regulator including: a driver coupled to a driver power supply; a controller coupled to a controller power supply and configured to couple the controller power supply to the driver during a startup period; and a driver-wake circuit, included in the driver, receiving power from the controller power supply during the startup period to control a temperature-monitoring pin of the driver according to a driver-supply voltage of the driver power supply.

In some aspects, the techniques described herein relate to a method for sensing a readiness of a driver in a switching regulator, the method including: starting a controller power supply for a controller of the switching regulator; coupling the controller power supply to a the driver of the switching regulator; enabling a driver power supply of the driver of the switching regulator; comparing a driver-supply voltage of the driver power supply to a controller-supply voltage of the controller power supply; powering a driver-wake circuit of the driver using a greater of the driver-supply voltage and the controller-supply voltage; comparing, using the driver-wake circuit, the driver-supply voltage to a power-on-reset threshold; generating, using the driver-wake circuit, a short-circuit condition at a temperature-monitoring pin of the driver while the driver-supply voltage is less than a power-on-reset threshold; generating, using the driver-wake circuit an open-circuit condition at the temperature-monitoring pin of the driver while the driver-supply voltage is greater than the power-on-reset threshold; and sensing the readiness of the driver based on the short-circuit condition or the open-circuit condition of the temperature-monitoring pin.

In some aspects, the techniques described herein relate to a multiphase switching regulator including: a controller configured to receive power from a first power supply at a first-supply pin and to couple the power from the first power supply to a driver-ON pin; a first driver coupled to the driver-ON pin at a first-driver-wake pin and coupled to a second power supply at a second-supply pin, the first driver including configured to: receive power from the first power supply and block power from the second power supply while a second power supply voltage is less than a first power supply voltage; and a second driver coupled to the driver-ON pin at a second-driver-wake pin and coupled to a third power supply at a third-supply pin, the second driver including configured to: receive power from the first power supply and block power from the third power supply while a third power supply voltage is less than the first power supply voltage.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A switching regulator may include a controller and one or more drivers. The one or more drivers may be powered for operation by one or more power supplies, which may be different from the power supply used to power the controller. The driver can not be operated properly until the power supply supplying the driver reaches a sufficient voltage. For example, a driver may not be able to provide a stable feedback signal to the controller until the driver's power supply is at a voltage that is sufficiently high. Thus, the controller may wait for all drivers to be ready before commencing operation (i.e., regulation). This wait time may be longer than needed when the communication for reporting requires the driver's power supply to be fully stabilized. Adding a dedicated communication channel to report the driver's readiness may have the technical problems of consuming too much power and/or requiring additional pins. A driver is disclosed that addresses these technical problems using a driver-wake circuit that can report readiness over an existing pin used for another purpose after startup and that can temporarily draw power from the controller's power supply until the driver's own power supply reaches a sufficient voltage.

Figure 1:
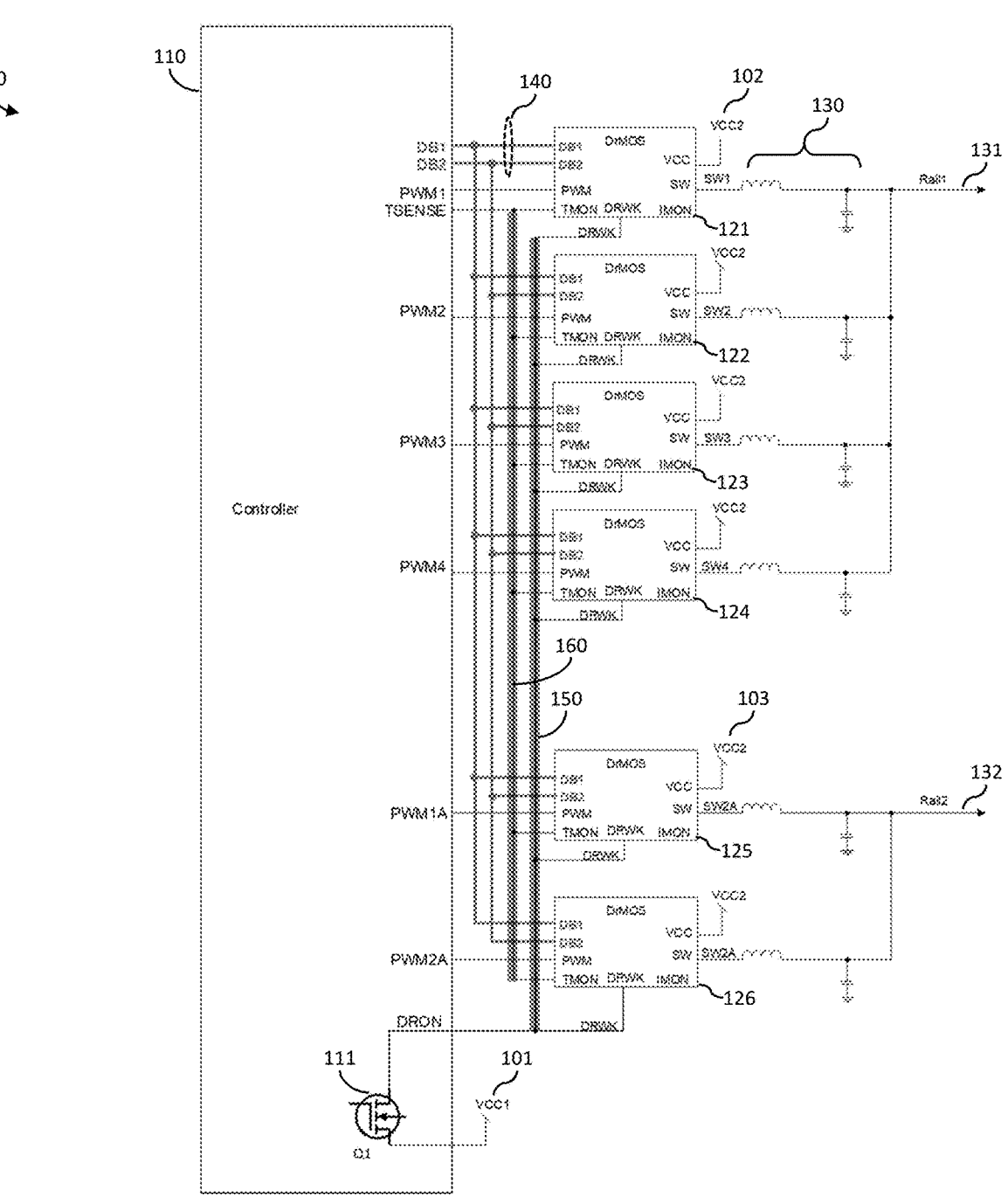
FIG. 1 is a schematic block diagram of a multiphase switching regulator according to a possible implementation of the present disclosure.

FIG. 1 is a schematic block diagram of a multiphase switching regulator according to a possible implementation of the present disclosure. The multiphase switching regulator 100 can include multiple rails configured to output a regulated voltage. As shown, the multiphase switching regulator 100 includes a first rail 131 and a second rail 132. Each rail can include multiple phases that are combined to provide the required current to drive a load coupled to the rail, even as the load changes. In a possible implementation, the phases for a rail may be activated or deactivated based on the power requirements of a load. While each phase may be identical, each rail may include a different number of phases to provide the power (e.g., current) necessary for the rail. As shown in FIG. 1, the first rail 131 includes four phases, while the second rail 132 includes two phases.

The multiphase switching regulator 100 includes a controller 110. The controller 110 may be configured by software instructions to configure the controller to carry out the operations of the switching regulator. For example, during regulation, the controller 110 may be configured to transmit switching signals (i.e., pulse width modulation (PWM) signals) at a plurality of PWM outputs (e.g., PWM1, PWM2, PWM3, PWM4, PWM1A, PWM2A), with one PWM output for each of the plurality of phases. Also during regulation, the controller 110 may be configured to monitor the functioning of the phases. For example, the controller 110 may receive a temperature signal at a temperature sense pin (i.e., TSENSE) from all of the phases over a temperature bus 160. When the temperature signal indicates that one or more of the phases is above a maximum temperature, the controller 110 may be configured to disable the phases by transmitting a signal over an enable-bus 150. The controller 110 includes a driver-ON pin (i.e., DRON) coupled to the enable-bus 150. The DRON pin can be electrically coupled to a first power supply 101 (i.e., controller power supply), which powers the controller 110, via an enable transistor 111 (i.e., Q1) of the controller 110.

Each phase may include a driver and a filter 130. As shown in FIG. 1, the first rail 131 includes a first driver 121, a second driver 122, a third driver 123, and a fourth driver 124, while the second rail 132 includes a fifth driver 125 and a sixth driver 126. Each driver may include two high-power switches in a half-bridge configuration. Each high-power switch may be a transistor, such as a metal oxide semiconductor field effect transistor (i.e., MOSFET). Each driver may further include driving circuitry configured to drive the high-power MOSFETs ON and OFF according to the PWM signal received at the driver's PWM pin. The switches and the gate driving circuitry can be integrated together in a device (e.g., integrated circuit (IC)) known as an integrated MOSFET driver (i.e., DrMOS). While the driver of the present disclosure is not limited to the DrMOS implementation, this implementation will be assumed in what follows. Accordingly, the terms "driver" and "DrMOS" may be used interchangeably.

Figure 2:
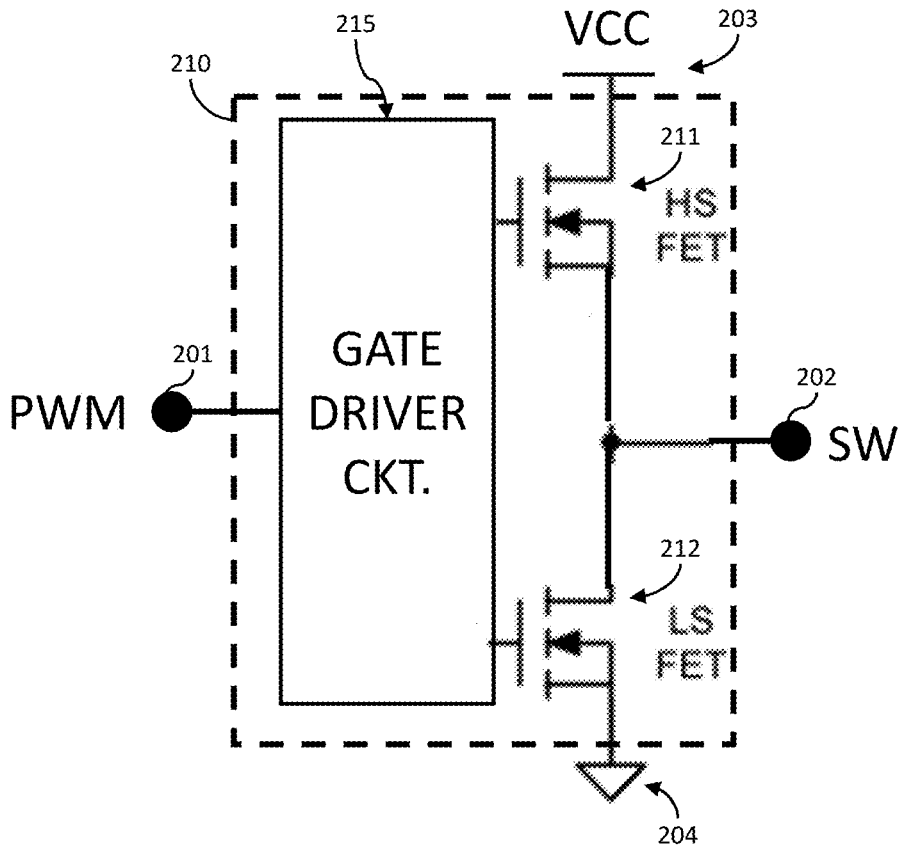
FIG. 2 is a schematic of a high-power portion of an integrated MOSFET driver according to a possible implementation of the present disclosure.

FIG. 2 is a schematic of a high-power portion 210 of a DrMOS used to regulate a phase of the multiphase switching regulator 100. The high-power portion 210 includes a high-side transistor (e.g., high-side MOSFET 211) coupled between a switch-node pin 202 of the driver and a driver power supply 203. The high-power portion 210 further includes a low-side transistor (e.g., low-side MOSFET 212) coupled between the switch-node pin 202 and a ground 204 of the driver. The high-power portion 210 further includes a gate driver circuit 215 configured to switch the high-side MOSFET (i.e., HS-FET) and the low-side MOSFET (i.e., LS-FET) according to a PWM signal received at the PWM pin 201 of the driver.

Returning to FIG. 1, the drivers of the first rail 131 may be coupled to a second power supply 102 (i.e., driver power supply) of the multiphase switching regulator 100. The second power supply 102 may be configured to output a driver-supply voltage (VCC2) that is different from a controller-supply voltage (i.e., VCC1) output by the first power supply 101. For example, VCC2 may be a voltage (e.g., 5 volts) that is higher than VCC1 (e.g., 3.3 volts). In one possible implementation, the drivers of the multiphase switching regulator 100 are all coupled to the same power supply. In another possible implementation, the drivers of the multiphase switching regulator 100 are coupled to different power supplies. For example, as shown, the first driver 121, the second driver 122, the third driver 123, and the fourth driver 124 (i.e., drivers of the first rail 131) may be coupled to the second power supply 102, while the fifth driver 125 and the sixth driver 126 (i.e., drivers of the second rail 132) may be coupled to a third power supply 103. The second power supply 102 and the third power supply 103 may be configured to output the same driver-supply voltage (VCC2). This configuration may be advantageous when one power supply is insufficient to supply all drivers based on the power supply's position and/or availability relative to the plurality of drivers.

In a possible implementation, the controller 110 and the drivers can communicate using synchronous, serial communication over a communication bus 140. Accordingly, the communication bus 140 can include a data line (i.e., DB1) configured to carry digital packets and a clock line (i.e., DB2) configured to carry a digital clock signal.

The drivers of the multiphase switching regulator 100 are switched by PWM signals from the PWM pins of the controller during regulation, but before regulation can begin, each of the power supplies in the multiphase switching regulator 100 must be at an appropriate operating voltage. Otherwise, a malfunction (e.g., shoot-through condition) can occur. The malfunction can cause damage to the multiphase switching regulator 100 and/or to a device coupled to the multiphase switching regulator 100, especially in a high-power environment. To prevent a malfunction from occurring, the controller 110 can be configured to wait until all the drivers are fully functional before beginning regulation. Knowing exactly when a driver is fully functional is impossible without communicating with the driver. Communication with the driver over the communication bus 140, however, cannot be established until the driver is fully functional. As a result, the controller may be configured to wait a startup period that is longer than needed to ensure that the driver has enough time to become fully functional before establishing communication over the communication bus 140.

The disclosed systems and methods can reduce a startup period of a multiphase switching regulator 100 by establishing a means for communicating a ready status of a driver to the controller when no communication bus 140 is present or before communication over the communication bus 140 has been established. In other words, the driver may communicate its ready status without using the communication bus and the controller may respond immediately to a driver with a ready status by configuring it in an operating mode. A driver in an operating mode may be configured to (i) communicate with the driver over the communication bus 140, (ii) switch a high-side MOSFET 211 and a low-side MOSFET 212 according to a PWM signal received at a PWM pin, and/or (iii) report a temperature to the controller at a temperature monitoring pin. The driver may be configured in the operating mode after operating in a startup mode.

Figure 3:
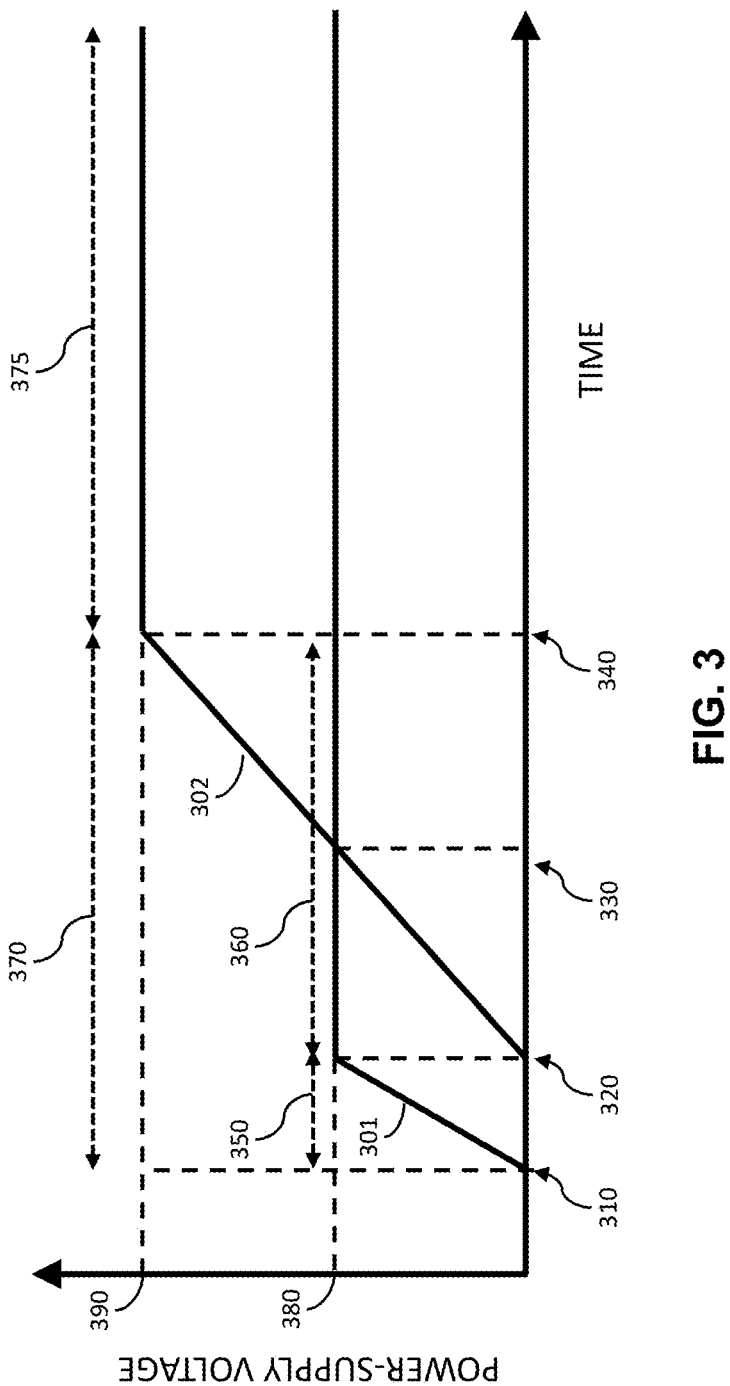
FIG. 3 is a graph illustrating a startup of the power-supplies of a switching regulator according to a possible implementation of the present disclosure.

FIG. 3 is a graph illustrating a startup of the power-supplies of a switching regulator according to a possible implementation of the present disclosure. At an activation time 310, a controller-supply voltage 301 of the controller power supply increases from a zero voltage to a controller-supply-ready voltage 380 over a controller-startup period 350. The controller power supply is ready at a controller-ready time 320 when the controller power supply reaches the controller-supply-ready voltage 380. Before the controller-ready time 320, the controller may not be fully functional (i.e., is not ready).

Upon reaching the controller-supply-ready voltage 380, the controller may configure an enable transistor 111 in an ON condition so that a driver-wake signal, corresponding to the controller-supply-ready voltage 380, is transmitted to the drivers over the enable-bus 150. The relatively high voltage level of the driver-wake signal can activate (i.e., turn-ON) the driver power supply. At a controller-ready time 320, the driver power supply generates a driver-supply voltage 302. The driver-supply voltage 302 increases from a zero voltage at the controller-ready time 320 to over a driver startup period 360. The driver power supply is ready at a driver-ready time 340 when the driver power supply reaches the driver-supply-ready voltage 390. Before the driver-ready time 340, the driver may not be fully functional (i.e., is not ready).

During the driver startup period 360, there is a crossover time 330 at which the driver-supply voltage 302 becomes greater than the controller-supply voltage 301. Before the crossover time 330, the driver power supply may not be capable of providing the power (e.g., voltage) necessary to communicate a ready status to the controller, and after the crossover time 330 the driver power supply may be capable of providing the power (e.g., voltage) necessary to for communicating a ready status to the controller.

At a driver-ready time 340 the driver reaches the driver-supply-ready voltage 390. At this time, an operating period 375 may begin. The controller and the driver of a switching regulator may be operated in a startup mode during the startup period 370, and the controller and the driver of the switching regulator may be operated in an operating mode during the operating period 375.

Figure 4:
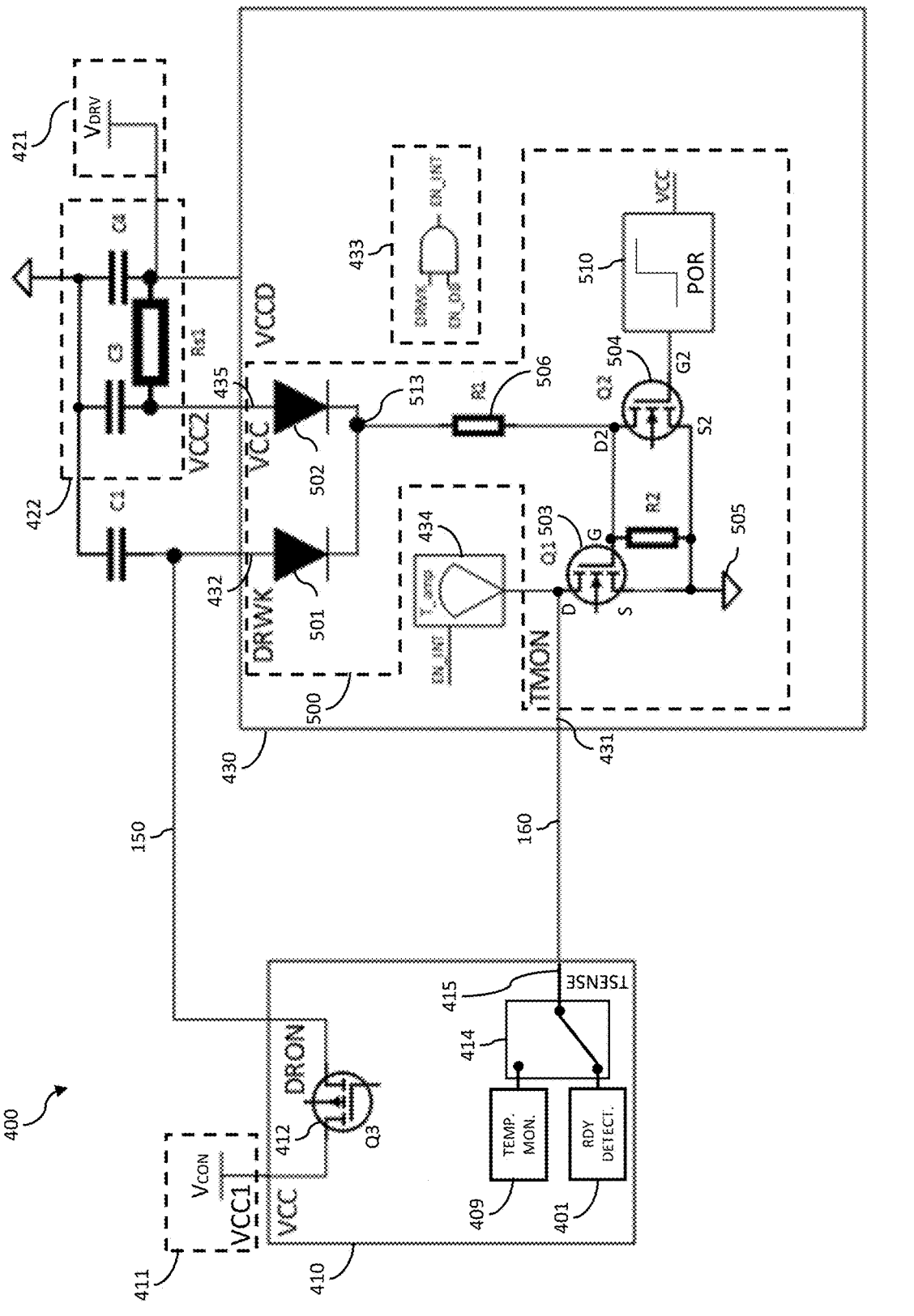
FIG. 4 is a schematic block diagram of a switching regulator with a driver-wake circuit according to a possible implementation of the present disclosure.

FIG. 4 is a schematic block diagram of a switching regulator with a driver-wake circuit according to a possible implementation of the present disclosure. The switching regulator 400 includes a controller 410 that is powered for electric function by a controller power supply 411. The controller 410 includes an enable-transistor 412 (Q3) that can be configured in an ON condition when the controller power supply 411 is ready. For example, the controller power supply 411 is ready when it is at a voltage (i.e., $V_{CON}$) meets one or more criteria (e.g., with a threshold of a voltage, steady for a period, etc.).

Upon the controller being activated it may be configured in a startup mode. In the startup mode, the temperature-sense pin 415 (i.e., $T_{SENSE}$) of the controller 410 may be coupled (e.g., by a switch 414) to a ready-detection circuit 401 and decoupled from a temperature monitoring circuit 409. In other words, in the startup mode, the controller 410 may be configured to sense the readiness of a driver 430 by a signal received at the temperature-sense pin 415 from the temperature-bus 160. Sensing the readiness of the driver may temporarily replace sensing a temperature reported by the driver. Accordingly, in the startup mode, a temperature monitoring circuit 409 may be decoupled (by the switch 414) from the temperature-sense pin 415.

The switching regulator 400 includes a driver 430 that is powered for electric function by a driver power supply 421. In a possible implementation, the driver power supply 421 is activated at the same time that the controller power supply 411 is activated. In another possible implementation, the driver power supply 421 is activated after the controller power supply 411 is activated. For example, the driver power supply 421 can be activated based on a driver wake signal transmitted to a driver-wake pin 432 of the driver over the enable-bus 150.

The driver power supply 421 may be include a filter 422 (e.g., low pass filter) and the driver 430 may output a filtered driver-supply voltage (VCC2) and an unfiltered (i.e., digital) driver supply voltage (VCCD).

The driver 430 of the switching regulator 400 includes a driver-wake circuit 500. The driver-wake circuit 500 is coupled to the controller power supply 411 at a driver-wake pin 432 (DRWK) when the enable-transistor 412 is in the ON condition. The driver-wake circuit 500 is also coupled to the driver power supply 421 at a supply pin 435 (VCC) via the filter 422.

The driver 430 includes an analog-OR circuit configured to output the higher of two inputs. The analog-OR is coupled at a first input to the controller power supply 411 and at a second input to the driver power supply 421. The analog-OR is configured to output the higher of the controller power supply 411 or the driver power supply 421 to a power node 513 of the driver 430.

In a possible implementation, the analog-OR circuit includes a first diode 501 coupled between the driver-wake pin 432 and the power node 513 and a second diode 502 coupled between the supply pin 435 and the power node 513. The anodes are oriented so that when the controller power supply 411 has a voltage that is higher than the driver power supply 421, the first diode 501 is ON (i.e., conducting) and the second diode 502 is OFF (i.e., not conducting, blocking). Further, when the controller power supply 411 has a voltage that is lower than the driver power supply 421, the first diode 501 is OFF (i.e. blocking) and the second diode 502 is ON (i.e., conducting).

Returning to FIG. 3, during the driver startup period 360 before the crossover time 330, the driver-wake circuit 500 receives power from the controller power supply 411 through the first diode and negligible (e.g., zero) power (e.g., current) is drawn from the driver power supply 421 through the second diode 502. Alternatively, after the crossover time 330, the driver-wake circuit 500 receives power from the driver power supply 421 through the second diode and negligible (e.g., zero) power (e.g., current) is drawn from the controller power supply 411 through the first diode 501. Accordingly, the driver-wake circuit 500 is powered to operate before the driver power supply 421 is ready (i.e., before the driver-ready time 340).

Returning to FIG. 4, the driver-wake circuit 500 further includes an output transistor 503. In a possible implementation, the output transistor 503 is an N-type, MOSFET transistor. The output transistor 503 is coupled at a drain terminal (D) to a temperature-monitoring pin 431 (TMON) of the driver 430, at a source terminal(S) to a ground 505, and at a gate terminal (G) to the power node 513 via a pull-up resistor 506. A second resistor (R2) can be coupled between the gate terminal and the second diode 502 may be included to help set a voltage at the gate terminal. When the output transistor 503 is in an ON condition, the temperature-monitoring pin 431 is short-circuited to the ground 505. When the output transistor is in an OFF condition, the temperature-monitoring pin 431 is decoupled from the driver-wake circuit 500.

The driver-wake circuit 500 further includes a bypass transistor 504. In a possible implementation, the bypass transistor 504 is an N-type, MOSFET transistor. The bypass transistor 504 is coupled at a drain terminal (D2) to the gate terminal (G) of the output transistor 503 and at a source terminal (S2) to the ground 505. The bypass transistor 504 is controlled in an ON condition or an OFF condition by a threshold circuit 510 that is coupled to the bypass transistor 504 at a gate terminal (G2). When the bypass transistor 504 is in an ON condition, the gate terminal (G) of the output transistor 503 is pulled-down to the ground 505. When the bypass transistor 504 is in the OFF condition the gate terminal (G) of the output transistor 503 can be pulled-up to the voltage (e.g., $V_{CON}$) of the power node 513 by the pull-up resistor 506.

The threshold circuit 510 is configured to receive the driver-supply voltage at the supply pin 435 (i.e., VCC), and compare the driver-supply voltage to a power-on-reset (POR) threshold. In a possible implementation, the output of the threshold circuit 510 is a relatively LOW voltage when the driver-supply voltage is less than the POR threshold and a relatively HIGH voltage when the driver-supply voltage is greater than or equal to the POR threshold. In a possible implementation the POR threshold can be set (e.g., factory set, user defined) as the driver-supply-ready voltage 390. In this implementation, the bypass transistor 504 can be configured in an ON condition to pull-down the gate terminal of the output transistor 503 when the driver power supply 421 is ready.

The driver 430 may further include a temperature-sensing circuit 434. The temperature-sensing circuit 434 may include a temperature sensor and a temperature amplifier (T_amp) configured to convert a temperature of a phase of the multiphase switching regulator 100 to a voltage. The voltage may be transmitted to the temperature-monitoring pin 431 when the temperature-sensing circuit 434 is enabled.

The temperature-sensing circuit 434 may be enabled by an internal enable signal (EN_INT). For example, the temperature-sensing circuit 434 may be enabled when the driver 430 is in an operating mode. In a possible implementation, the temperature-sensing circuit 434 is enabled by a HIGH internal enable signal and disabled by a LOW internal enable signal.

The internal enable signal (EN_INT) may be generated by an internal-enable circuit 433. The internal-enable circuit 433 can include a logic circuit (e.g., AND gate). In a possible implementation, the internal enable signal is HIGH when the driver wake signal (DRWK) and a communication bus enable signal (EN_DB) are both HIGH. The communication bus enable signal is an enable message sent over the communication bus 140 after the driver is ready and communication over the 140 is established (i.e., in an operation mode). Otherwise, the internal enable signal is LOW and the temperature-sensing circuit 434 is decoupled from the temperature-monitoring pin 431.

It should be noted that a controller may still use the disclosed techniques to check driver readiness even when the communication bus 140 is absent, or unused for this purpose. In these implementations, the controller still checks driver readiness based on the status of the TMON pin while the driver is not sufficiently powered by its own power supply to determine when to send PWM regulation signals. For example, regulation may begin immediately after the TMON pin indicates that the driver is ready. Alternatively, regulation may begin after a wait period that is set (e.g., factory set) or programmed (e.g., user defined) to allow for operations of the driver (e.g., communication) to be started. Neither of these alternatives require the communication bus 140.

As mentioned previously, upon receiving a driver wake signal (DRWK), the driver may be configured in a startup mode. During the startup mode, the driver-wake circuit 500 may be enabled to output a status of the driver power supply 421 to a temperature-monitoring pin 431 of the driver. The driver-wake circuit 500 may be enabled for operation based on power received from the controller power supply or based on power received from the driver power supply. As described thus far, the selection of which power supply is used to enable the driver-wake circuit 500 for operation is based on a comparison between the driver-supply voltage and the controller-supply voltage, but alternative implementations may exist. For example, a threshold may be set and compared to determine when the driver supply is at a voltage that is sufficient to control (e.g., bias) the transistors (e.g., output transistor 503, bypass transistor 504) of the driver-wake circuit 500. The threshold may, or may not, be equal to the controller-supply voltage.

Returning to FIG. 3, during the driver startup period 360, the driver is in a not-ready condition while its voltage is below the POR threshold, which can be set equal to the driver-supply-ready voltage 390. The driver may be in the not ready condition even when its voltage is greater than the controller-supply voltage 301. For example, the driver may be (i) in a not ready condition and (ii) have a driver-supply voltage 302 less than the controller-supply voltage 301 during a first period between the controller-ready time 320 and the crossover time 330. Further, the driver may be (i) in a not ready condition and (ii) have a driver-supply voltage 302 greater than the controller-supply voltage 301 during a second period between the crossover time 330 and the driver-ready time 340.

Figure 5A:
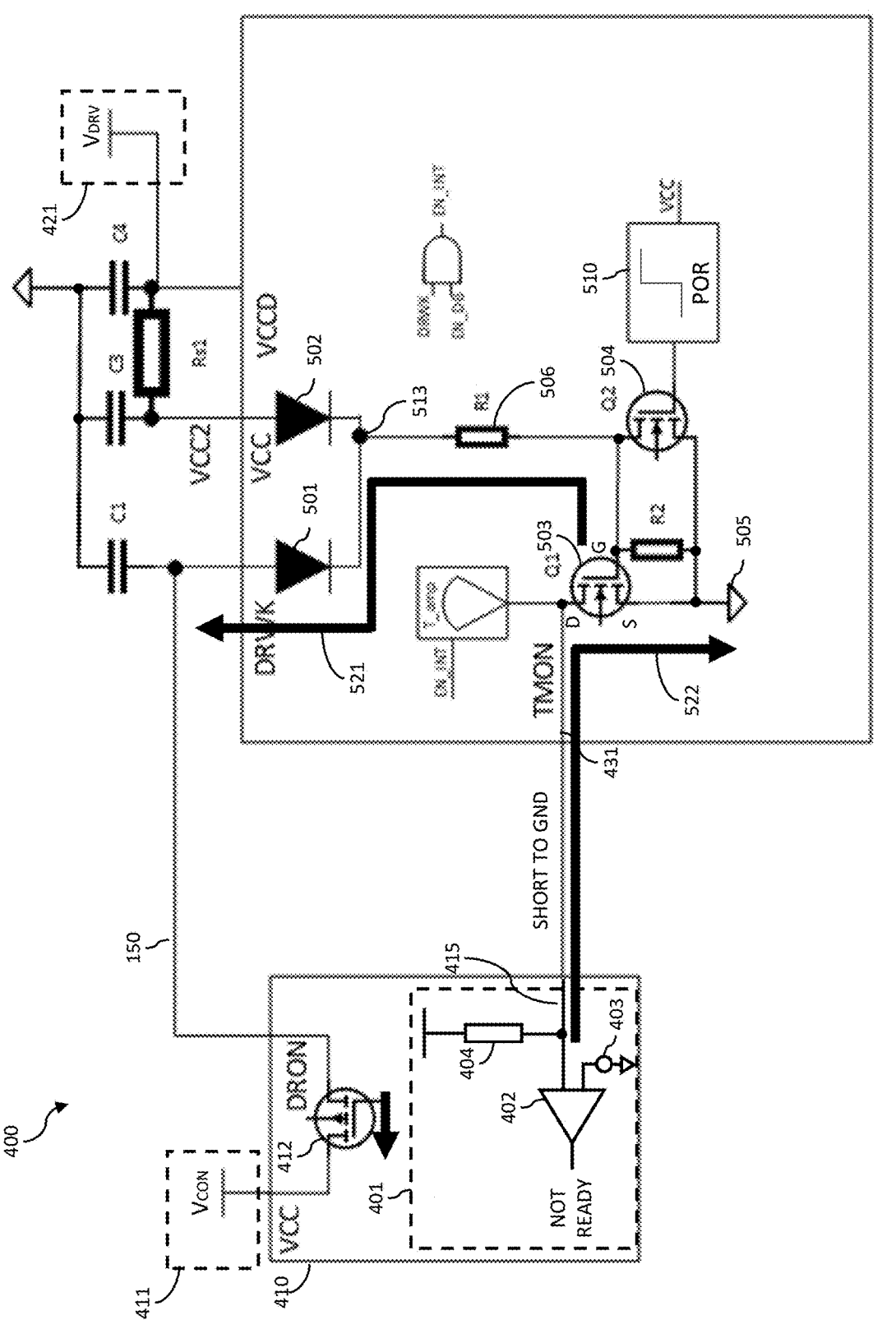
FIG. 5A illustrates the driver-wake circuit in a driver-not-ready condition according to a possible implementation of the present disclosure.

FIG. 5A illustrates the driver-wake circuit in a driver-not-ready condition according to a possible implementation of the present disclosure. In the condition shown, the driver-supply voltage ($V_{DRV}$) is less than the controller-supply voltage. Accordingly, second diode 502 is blocking the driver power supply 421 (i.e., is OFF) while the first diode 501 is coupling the controller power supply 411 (i.e., is ON). Additionally, the bypass transistor 504 is in an OFF condition because the driver-supply voltage ($V_{DRV}$) is less than the POR threshold. As a result, the gate terminal of the output transistor 503 is pulled up along a first pull-up path 521 including the pull-up resistor 506, the first diode 501 and the enable-transistor 412, which is in an ON condition. The voltage at the gate terminal of the output transistor 503 is sufficient to configure the output transistor 503 in an ON condition. Accordingly, the temperature-sense pin 415 of the controller is shorted to ground along a short-to-ground path 522.

A ready-detection circuit 401, which is included in the switching regulator 400, is configured to compare a voltage at the temperature-sense pin 415 to a ready threshold 403. In a possible implementation, the ready-detection circuit 401 includes a comparator 402 coupled to the temperature-sense pin 415 at a first input and coupled to a voltage supply corresponding to a ready threshold 403 at a second input.

When the temperature-monitoring pin 431 is short circuited to ground, as shown in FIG. 5A, then the ready-detection circuit 401 may be configured to output a not-ready signal based on the voltage at the temperature-sense pin 415 being less than the ready threshold 403.

Figure 5B:
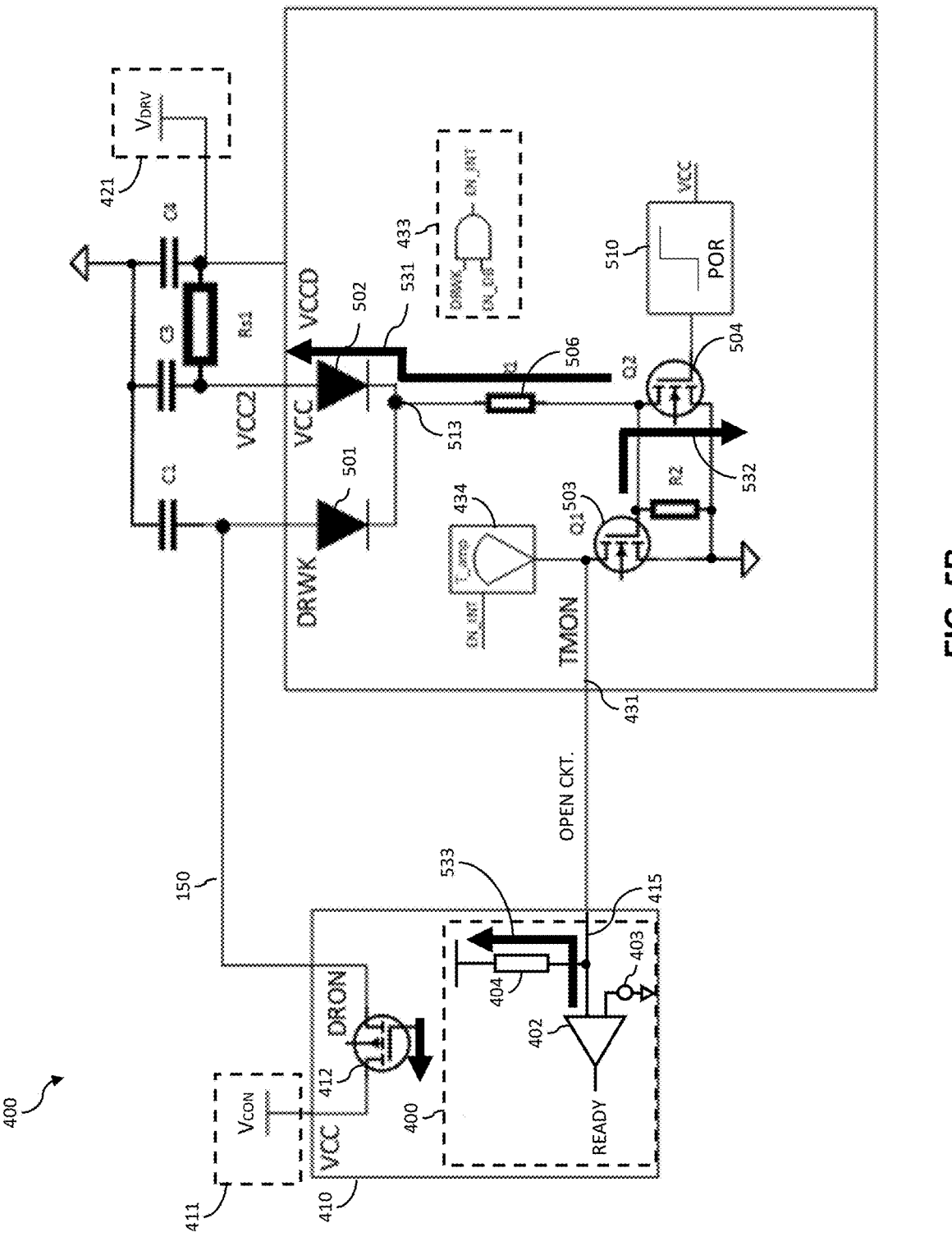
FIG. 5B illustrates the driver-wake circuit in a driver-ready condition according to a possible implementation of the present disclosure.

FIG. 5B illustrates the driver-wake circuit in a driver-ready condition according to a possible implementation of the present disclosure. In the condition shown, the driver-supply voltage ($V_{DRV}$) is greater than (or equal to) the controller-supply voltage. Accordingly, the first diode 501 is blocking the controller power supply 411 (i.e., is OFF) while the second diode 502 is coupling the driver power supply 421 (i.e., is ON) so that a second pull-up path 531 through a pull-up resistor 404 exists. Additionally, the bypass transistor 504 is in an ON condition because the driver-supply voltage ($V_{DRV}$) is greater than (or equal to) the POR threshold. As a result, the gate terminal of the output transistor 503 is shorted to ground along a bypass path 532, which configures the output transistor 503 in an OFF condition. Accordingly, the drain terminal of the output transistor 503 is an open drain so that the temperature-sense pin 415 of the controller is open circuited.

When the temperature-monitoring pin 431 is open circuited, then the ready-detection circuit 401 may be configured to pull-up the temperature-sense pin 415 along a open pull-up path 533 to a voltage that is higher than the ready threshold 403 (i.e., a high voltage). Accordingly, the comparator 402 is configured to output a ready signal. And the controller is triggered to configure the multiphase switching regulator 100 in an operating mode. The temperature-monitoring pin 431 remains decoupled from the temperature-sensing circuit 434 until the controller establishes communication with the driver over the communication bus 140 and sends the communication bus enable signal.

Figure 5C:
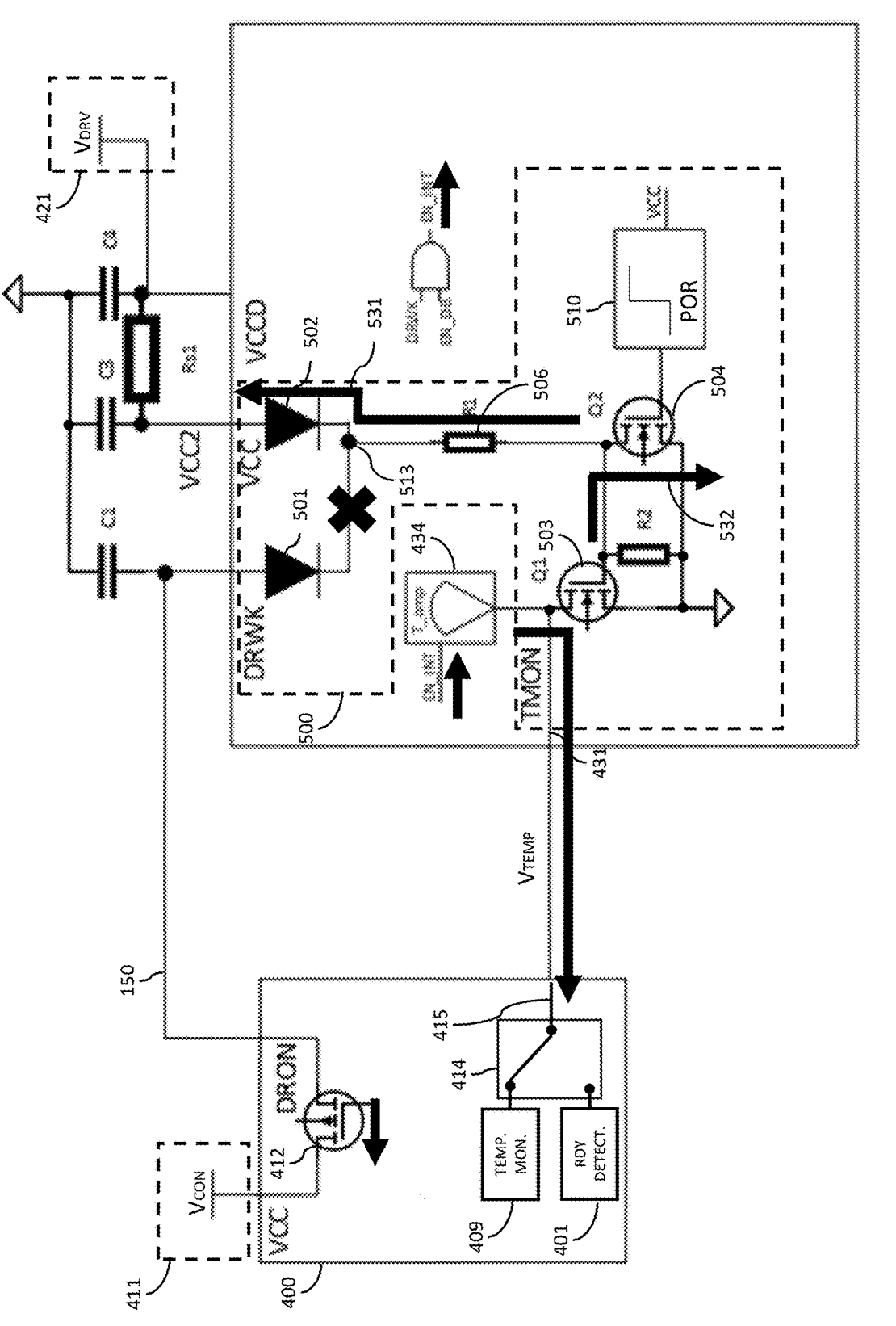
FIG. 5C illustrates the driver-wake circuit in an operating condition according to a possible implementation of the present disclosure.

FIG. 5C illustrates the driver-wake circuit in an operating condition according to a possible implementation of the present disclosure. In the condition shown, the controller 410 has been triggered by the ready signal to configure the switching regulator 400 in an operating mode. In the operating mode, the enable-transistor 412 remains in an ON condition but is decoupled from the driver-wake circuit 500 by the first diode 501 which remains in the OFF condition. Accordingly, the driver-wake circuit 500 draws very little current (e.g., leakage current) from the controller power supply 411 in the operating mode. The output transistor 503 remains in the OFF condition so that the driver-wake circuit 500 is decoupled from the temperature-monitoring pin 431. In the operating mode, the temperature-sensing circuit 434 is configured to transmit a volage ($V_{TEMP}$) corresponding to a sensed temperature to the temperature-monitoring pin 431. The controller 410 receives the voltage ($V_{TEMP}$) at a temperature monitoring circuit 409 which is coupled by switch 414 to the temperature-sense pin 415 of the switching regulator 400.

Figure 6:
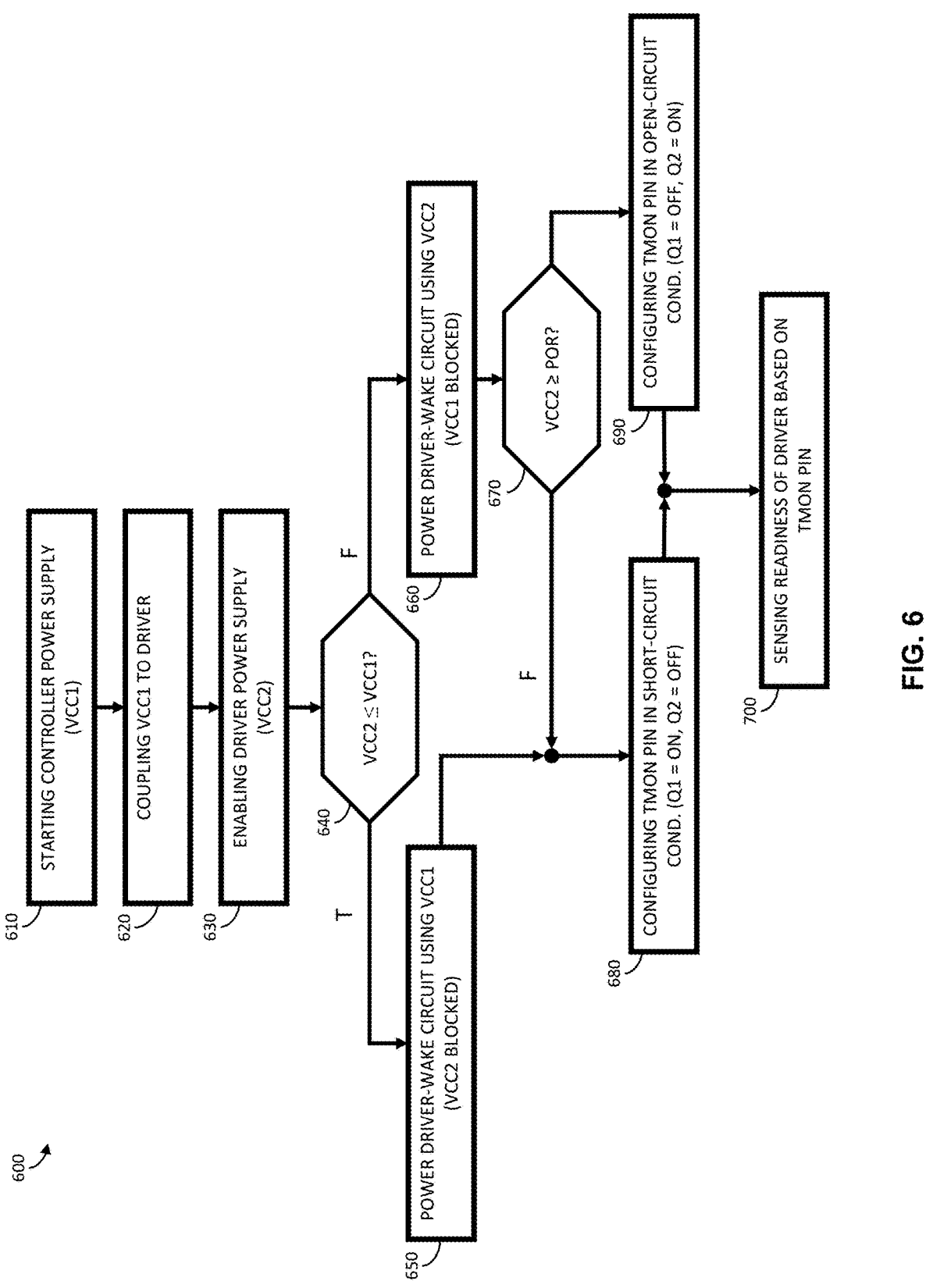
FIG. 6 is a flowchart of a method for sensing the readiness of a driver in a switching regulator according to a possible implementation of the present disclosure.

FIG. 6 is a flowchart of a method for sensing the readiness of a driver in a switching regulator according to a possible implementation of the present disclosure. The method 600 includes starting 610 a controller power supply (VCC1) for supplying power to a controller of the switching regulator. The method 600 further includes coupling 620 the controller power supply to a driver of the switching regulator. For example, the controller power supply may be coupled to an enable-bus 150 by an enable-transistor 412 of the controller when the controller is ready for operation (e.g., has increased and stabilized at a controller-supply-ready voltage). The method 600 further includes enabling 630 a driver power supply (VCC2) for supplying power to the driver. For example, the driver power supply may be enabled (e.g., activated, turned-ON, etc.) upon receiving the controller-supply voltage from the enable-bus at a driver-wake pin of the driver.

The method 600 further includes comparing 640 a driver-supply voltage of the driver power supply to a controller-supply voltage of the controller power supply. Based on the comparison, the method 600 further includes powering 650 a driver-wake circuit of the driver using the controller power supply (and blocking the driver power supply) while the driver-supply voltage is less than the controller-supply voltage. Alternatively, the method 600 includes powering 660 the driver-wake circuit using the driver power supply (and blocking the controller power supply) when the driver-supply voltage is greater than the controller-supply voltage.

While the driver-supply voltage is less than a POR threshold, the method 600 includes configuring 680 the driver-wake circuit to generate a short-circuit condition at the temperature monitoring pin of the driver. As shown in FIG. 5A, configuring the driver-wake circuit may include configuring the output transistor 503 (Q1) of the driver-wake circuit 500 in an ON condition and configuring the bypass transistor 504 (Q2) of the driver-wake circuit 500 in an OFF condition.

While the driver-supply voltage is greater than or equal to the POR threshold, the method 600 includes configuring 680 the driver-wake circuit to generate an open-circuit condition at the temperature monitoring pin of the driver. As shown in FIG. 5B, configuring the driver-wake circuit may include configuring the output transistor 503 (Q1) of the driver-wake circuit 500 in an OFF condition and configuring the bypass transistor 504 (Q2) of the driver-wake circuit 500 in an ON condition.

The method 600 further includes sensing the readiness of the driver based on the condition of the temperature monitoring pin (i.e., short circuit or open circuit).

Figure 7:
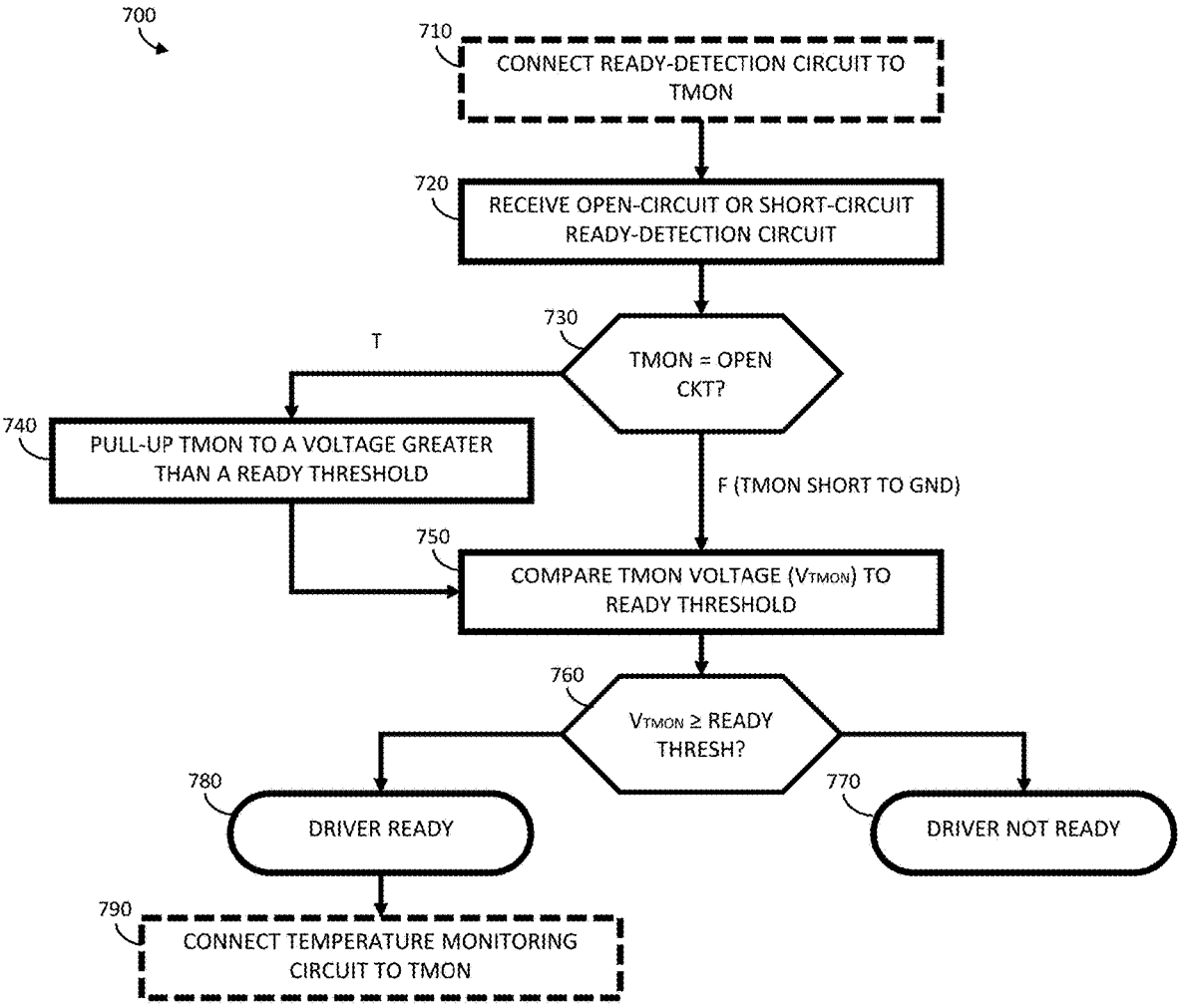
FIG. 7 is a flowchart illustrating a method of sensing the temperature monitoring pin that can be used with the method of FIG. 6.

FIG. 7 is a flowchart illustrating a method of sensing the temperature monitoring pin that can be used with the method of FIG. 6. The method 700 includes enabling the controller to sense the condition of the temperature monitoring pin. This may include connecting 710 the input of a ready-detection circuit to the temperature monitoring pin (e.g., via a temperature bus). The method 700 may further include receiving an open-circuit condition or a short-circuit condition at an input to the ready-detection circuit (i.e., at the temperature-sense pin of the controller). While an open-circuit condition exists, the method 700 includes pulling-up the temperature monitoring pin to a voltage (V) greater than a ready threshold (i.e., V=HIGH). While the short-circuit condition exists, the temperature monitoring pin is shorted to a voltage less than the ready threshold (i.e., V=LOW). The method 700 includes comparing the voltage at the temperature monitoring pin ($V_{TMON}$) to the ready threshold. When the voltage is greater than or equal to the ready threshold, then the driver is in a ready condition 780, otherwise the driver is in the not-ready condition 770. After the driver is in the ready condition 780, the method 700 may include connecting 790 the temperature monitoring circuit of the driver to the temperature monitoring pin to resume temperature reporting by the driver.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A switching regulator comprising:
a driver coupled to a driver power supply;
a controller coupled to a controller power supply and configured to couple the controller power supply to the driver during a startup period; and
a driver-wake circuit, included in the driver, configured to receive power from the controller power supply during the startup period to control a temperature-monitoring pin of the driver according to a driver-supply voltage of the driver power supply.

2. The switching regulator according to claim 1, wherein the controller is configured to:
couple the controller power supply to the driver during the startup period when the controller power supply reaches a controller-supply ready voltage corresponding to the controller being ready for operation; and
monitor the temperature-monitoring pin of the driver during the startup period to determine when the driver power supply has reached a driver-supply ready voltage corresponding to the driver being ready for operation.

3. The switching regulator according to claim 1, wherein the driver-wake circuit is configured to:
receive power from the controller power supply while the driver-supply voltage is less than a controller-supply voltage of the controller power supply; and
block power from the controller power supply while the driver-supply voltage is greater than the controller-supply voltage of the controller power supply.

4. The switching regulator according to claim 1, wherein the driver-wake circuit is configured to control an output transistor (Q1) coupled to the temperature-monitoring pin of the driver to be:
in an OFF condition when the driver-supply voltage is greater than or equal to a power-on-reset threshold; and
in an ON condition when the driver-supply voltage is less than the power-on-reset threshold.

5. The switching regulator according to claim 4, wherein the temperature-monitoring pin of the driver is coupled to an input of a ready-detection circuit of the controller.

6. The switching regulator according to claim 5, wherein the ready-detection circuit is configured to:
pull-up the input to a high voltage when the input is an open drain, the high voltage higher than a ready threshold.

7. The switching regulator according to claim 5, wherein the ready-detection circuit is configured to:
output a ready signal or not-ready signal based on a comparison between the input and a ready threshold.

8. The switching regulator according to claim 7, wherein the controller is further configured to:
determine that the driver is ready based on the ready signal; and
transmit an enable signal to trigger the driver to enable a temperature sensing circuit to transmit to the temperature-monitoring pin of the driver.

9. The switching regulator according to claim 1, wherein the driver-wake circuit is coupled to the controller power supply via a driver-wake pin (DRWK) and coupled to the driver power supply via a power pin (VCC).

10. The switching regulator according to claim 9, wherein the driver-wake circuit includes:
a first diode coupled between the driver-wake pin and a power node of the driver-wake circuit;
a second diode coupled between the power pin and the power node of the driver-wake circuit;
an output transistor coupled at a first drain terminal (D) to the temperature-monitoring pin, coupled at a first source terminal(S) to a ground, and coupled at a first gate terminal (G) to the power node via a pull-up resistor; and
a bypass transistor coupled at a second drain terminal (D2) to the first gate terminal (G) and the power node via the pull-up resistor, coupled at a second source terminal (S2) to the ground, and coupled at a second gate (G2) terminal to a threshold circuit, the threshold circuit configured to output a LOW signal while the driver-supply voltage is below a power-on-reset threshold and to output a HIGH signal while the driver-supply voltage is above the power-on-reset threshold.

11. The switching regulator according to claim 1, wherein the driver is one a plurality of drivers, the plurality of drivers are:
coupled at respective driver-wake pins to the controller power supply via an enable bus, wherein the enable bus is coupled to the controller power supply via an enable transistor of the controller; and
coupled at respective temperature monitoring pins to a ready-detection circuit of the controller via a temperature bus, wherein each temperature-monitoring pin is configured to be powered by the controller power supply to communicate a condition of each driver power supply to the temperature bus during the startup period.

12. The switching regulator according to claim 1 wherein the driver further includes:
a high-side transistor and a low-side transistor coupled in a series connection between the driver power supply and a ground;
a switch node pin coupled between the high-side transistor and the low-side transistor; and
a gate driver circuit configured to switch the high-side transistor and the low-side transistor according to a pulse-width-modulation (PWM) signal received at a PWM pin, wherein the gate driver circuit, the high-side transistor, and the low-side transistor are integrated together in an integrated circuit.

13. A method for sensing a readiness of a driver of a switching regulator, the method comprising:
starting a controller power supply for a controller of the switching regulator;
coupling the controller power supply to the driver of the switching regulator;
enabling a driver power supply of the driver of the switching regulator;
comparing a driver-supply voltage of the driver power supply to a controller-supply voltage of the controller power supply;
powering a driver-wake circuit of the driver using a greater of the driver-supply voltage and the controller-supply voltage;
comparing, using the driver-wake circuit, the driver-supply voltage to a power-on-reset threshold;

configuring the driver-wake circuit to generate a short-circuit condition at a temperature-monitoring pin of the driver while the driver-supply voltage is less than a power-on-reset threshold;

configuring the driver-wake circuit to generate an open-circuit condition at the temperature-monitoring pin of the driver while the driver-supply voltage is greater than the power-on-reset threshold; and sensing the readiness of the driver based on the short-circuit condition or the open-circuit condition of the temperature-monitoring pin.

14. The method according to claim 13, wherein the driver power supply is enabled when the controller power supply reaches a controller-supply ready voltage.

15. The method according to claim 13, wherein sensing the readiness of the driver includes:

determining that a voltage of the temperature-monitoring pin is less than a ready threshold while the temperature-monitoring pin is in the short-circuit condition.

16. The method according to claim 13, wherein sensing the readiness of the driver includes:

determining that a voltage of the temperature-monitoring pin is greater than a ready threshold while the temperature-monitoring pin is in the open-circuit condition.

17. The method according to claim 16, wherein determining that the voltage of the temperature-monitoring pin is greater than the ready threshold while the temperature-monitoring pin is in the open-circuit condition includes:

pulling-up a temperature-sense pin to a high voltage level above the ready threshold when the temperature-sense pin is coupled to the temperature-monitoring pin in the open-circuit condition.

18. The method according to claim 16, further comprising:

decoupling a temperature-sensing circuit from the temperature-monitoring pin upon starting the driver power supply; and recoupling the temperature-sensing circuit to the temperature-monitoring pin after the driver is ready.

19. A multiphase switching regulator comprising:

a controller configured to receive power from a first power supply at a first supply pin and to couple the power from the first power supply to a driver-ON pin;

a first driver coupled to the driver-ON pin via a first-driver-wake pin and coupled to a second power supply via a second-supply pin, the first driver configured to:

receive power from the first power supply and block power from the second power supply while a second power supply voltage is less than a first power supply voltage; and a second driver coupled to the driver-ON pin via a second-driver-wake pin and coupled to a third power supply at a third-supply pin, the second driver configured to:

receive power from the first power supply and block power from the third power supply while a third power supply voltage is less than the first power supply voltage.

20. The multiphase switching regulator according to claim 19, wherein:

the first driver is further configured to block power from the first power supply and receive power from the second power supply while the second power supply voltage is greater than the first power supply voltage; and the second driver is further configured to block power from the first power supply and receive power from the third power supply while the third power supply voltage is greater than the first power supply voltage.

21. The multiphase switching regulator according to claim 19, wherein:

the first driver is further configured to control a first condition of a first temperature-monitoring pin based on a comparison of the second power supply voltage to a first threshold; and the second driver is further configured to control a second condition of a second temperature-monitoring pin based on a comparison of the third power supply voltage to a second threshold.

22. The multiphase switching regulator according to claim 21, wherein the controller includes a ready detection circuit coupled to the first temperature-monitoring pin and the second temperature-monitoring pin, the ready detection circuit configured to:

sense a readiness of the first driver based on the first condition of the first temperature-monitoring pin and the readiness of the second driver based on the second condition of the second temperature-monitoring pin.

* * * * *